US006973927B1

(12) United States Patent  (10) Patent No.: US 6,973,927 B1
Stewart  (45) Date of Patent: Dec. 13, 2005

(54) WIND SCREEN APPARATUS FOR OUTDOOR GRILLS

(76) Inventor: Douglas B. Stewart, 166 Rainbow Dr., #6660, Livingston, TX (US) 77399-1066

( * ) Notice: Subject to any disclaimer, the term of this patent is extended or adjusted under 35 U.S.C. 154(b) by 0 days.

(21) Appl. No.: 10/886,238

(22) Filed: Jul. 7, 2004

Related U.S. Application Data

(63) Continuation-in-part of application No. 10/776,577, filed on Feb. 11, 2004.

(60) Provisional application No. 60/497,097, filed on Aug. 22, 2003.

(51) Int. Cl.[7] .............................................. F24C 1/08
(52) U.S. Cl. ...................... 126/98; 126/25 R; 126/29; 126/201
(58) Field of Search .............................. 126/25 R, 9 R, 126/9 B, 29, 41 R, 201, 505

(56) References Cited

U.S. PATENT DOCUMENTS 2,559,243 A * 7/1951 Brown ....................... 126/9 R
3,713,432 A    1/1973 Finley ........................ 126/38
3,789,821 A    2/1974 Fick et al. ................... 126/38
3,814,078 A    6/1974 Etzcorn ................... 126/299 C
4,127,099 A * 11/1978 Fortier ....................... 126/505
4,794,906 A *  1/1989 Longley, Jr. ................ 126/9 R
D303,909 S   10/1989 Stankus et al. .............. D7/406
5,094,223 A *  3/1992 Gonzalez ................... 126/25 R
5,351,673 A   10/1994 Somerton ............... 126/214 D
5,967,136 A   10/1999 Gray et al. ............. 126/299 R
6,125,837 A * 10/2000 Mulberry ................. 126/41 R
2003/0230298 A1* 12/2003 Klarich et al. .............. 126/9 R

* cited by examiner

Primary Examiner—Stephen Gravini
(74) Attorney, Agent, or Firm—Sturm & Fix LLP

(57) ABSTRACT

A windscreen apparatus (10) for outdoor cooking grills wherein, the apparatus (10) includes a base member (20) that supports a cooking grill and a pair of side wall members (30) (30') and a rear wall member (40) adapted to be pivoted into an upright position relative to the base member (20) wherein, at least the rear wall member (40) is hingedly connected (50') to the base member (20) and wherein, all of the wall members (30) (30') and (40) have a height greater than the top of the cooking grill.

20 Claims, 4 Drawing Sheets

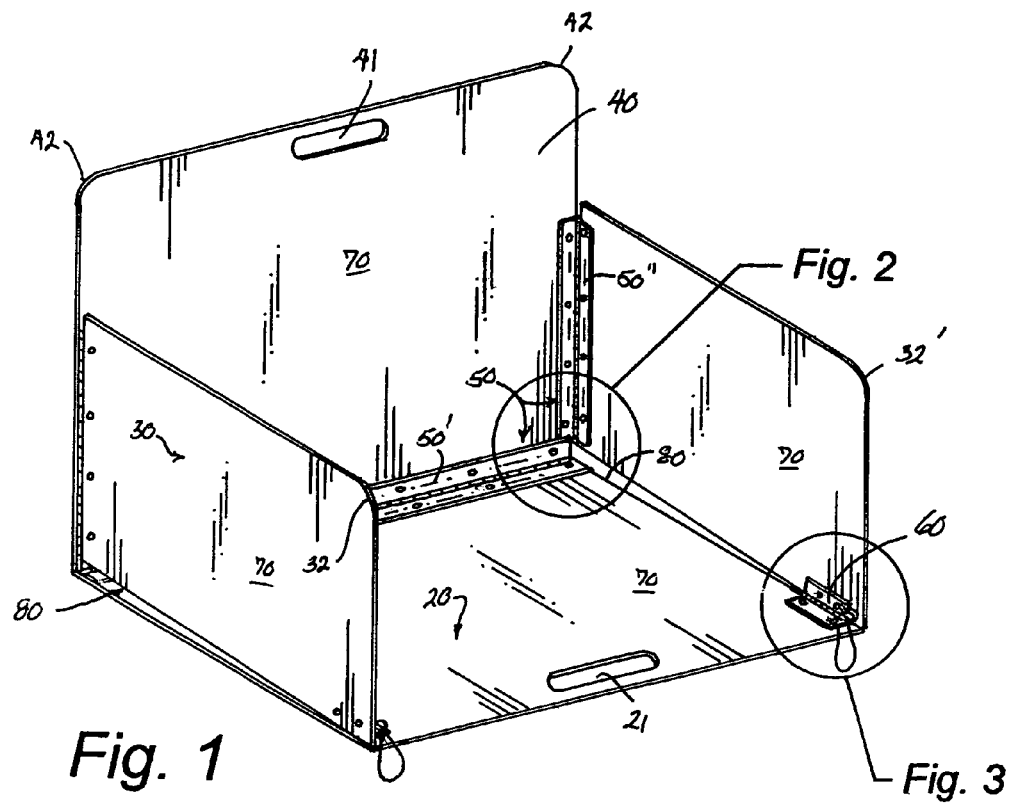
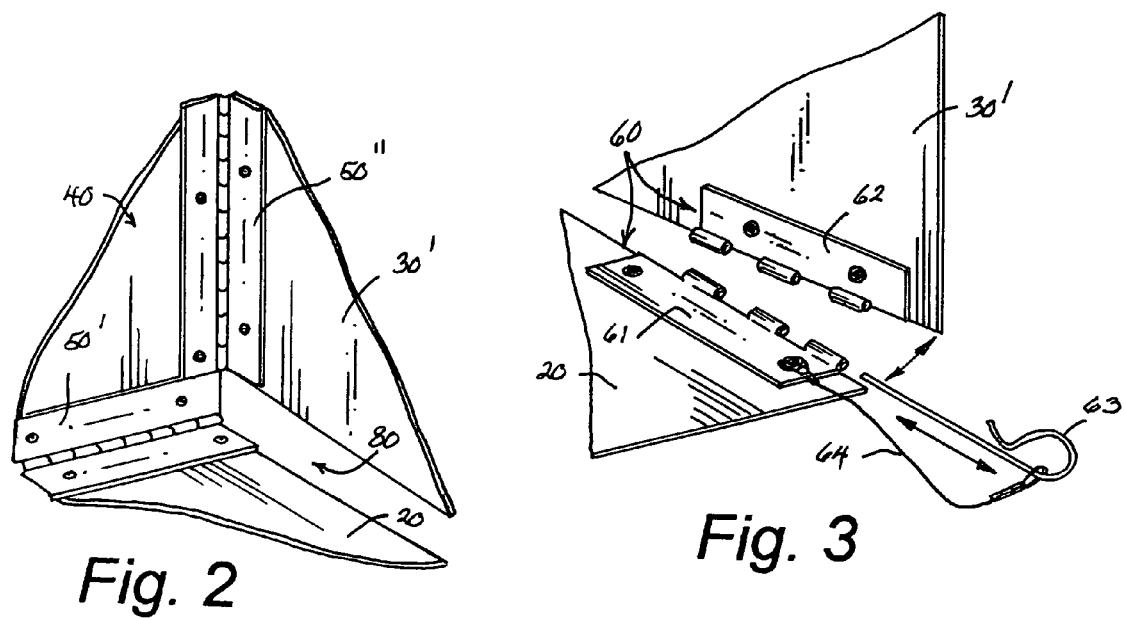

WIND SCREEN APPARATUS FOR OUTDOOR GRILLS

CROSS REFERENCE TO RELATED APPLICATIONS

This application is based on Provisional Patent Application Ser. No. 60/497,097, filed in the United States Patent and Trademark Office on Aug. 22, 2003; and is a Continuation-In-Part application of U.S. patent application Ser. No. 10/776,577, filed in the United States Patent and Trademark Office on Feb. 11, 2004, and entitled Wind Screen Apparatus.

BACKGROUND OF THE INVENTION

1. Field of the Invention

The present invention relates to the field of wind deflectors for outdoor cooking appliances in general and in particular to a wind screen that envelops three sides and the bottom of an outdoor cooking appliance.

2. Description of Related Art

As can be seen by reference to the following U.S. Pat. Nos. 3,713,432; 3,814,078; 3,789,821; 5,351,673; 5,967,136; and Des. 303,909, the prior art is replete with myriad and diverse wind deflecting arrangements for outdoor cooking appliances such as gas and charcoal grills, etc.

While all of the aforementioned prior art constructions are more than adequate for the basic purpose and function for which they have been specifically designed, they are uniformly deficient with respect to their failure to provide a simple, efficient, and practical windscreen apparatus that is neither attached to nor rests upon the outdoor cooking appliance.

Not only are these prior art windscreen arrangements cumbersome to use, costly to manufacture and prone to breakage, but more importantly, their hinged connections are normally disposed at the same level as the heat source which permits a certain volume of moving air to disrupt the cooking process and therefore diminishes the effectiveness of the windscreen.

As a consequence of the foregoing situation, there has existed a longstanding need among outdoor cooking enthusiasts for a new and improved windscreen apparatus for outdoor grills that surrounds three sides and the bottom of the grill wherein, any air leakage through the windscreen apparatus occurs substantially below the level of the flames, and the provision of such a windscreen apparatus is the stated objective of the present invention.

BRIEF SUMMARY OF THE INVENTION

Briefly stated, the windscreen apparatus that forms the basis of the present invention comprises a base member, a pair of opposed side wall members and a rear wall member that are hingedly associated with one another to form an enclosure that surrounds the bottom and three sides of an outdoor cooking appliance such as a gas or charcoal grill.

As will be explained in greater detail further on in the specification, the base, side wall and rear wall members are all fabricated from sheets of heat proof, fireproof material such as aluminum, steel, etc., wherein, the opposed side wall members and the rear wall members are hingedly connected to the base member, and the side wall members are releasably engagable with the base member in their operative mode of deployment.

In addition, both the rear wall member and the base member are provided with handle apertures that allow the wind screen apparatus to be transported conveniently in its collapsed state, and the apparatus is optionally provided with one or more access openings proximate the hinged connections between the wall members and the base member to accommodate gas line hoses from one or more propane gas sources.

Furthermore, not only do the wall members provide a heat shield and splatter guard for the cooking appliances, but the base member also serves as a drip catcher and heat shield for any surface that the wind screen apparatus rests upon.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a front perspective view of the preferred embodiment of the wind screen apparatus that forms the basis of the present invention;

FIG. 2 is an enlarged detail view of the hinged connections between the rear wall member, the base member and one of the side wall members;

Figure 4:
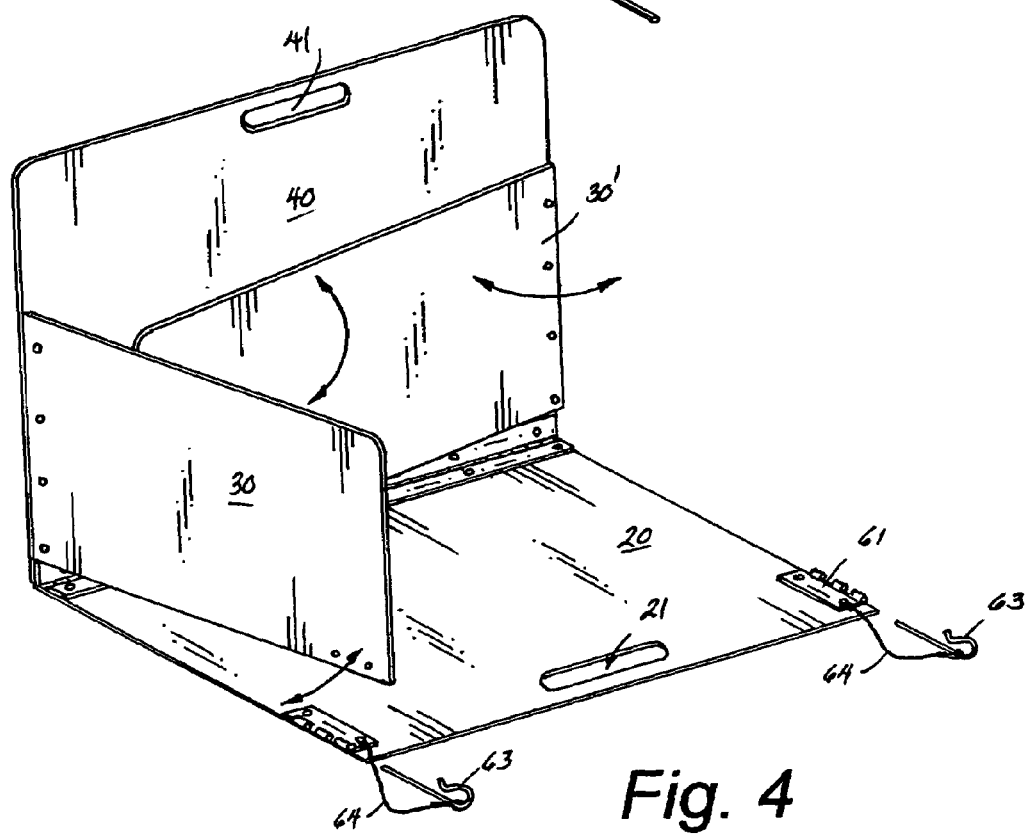
Figure 5:
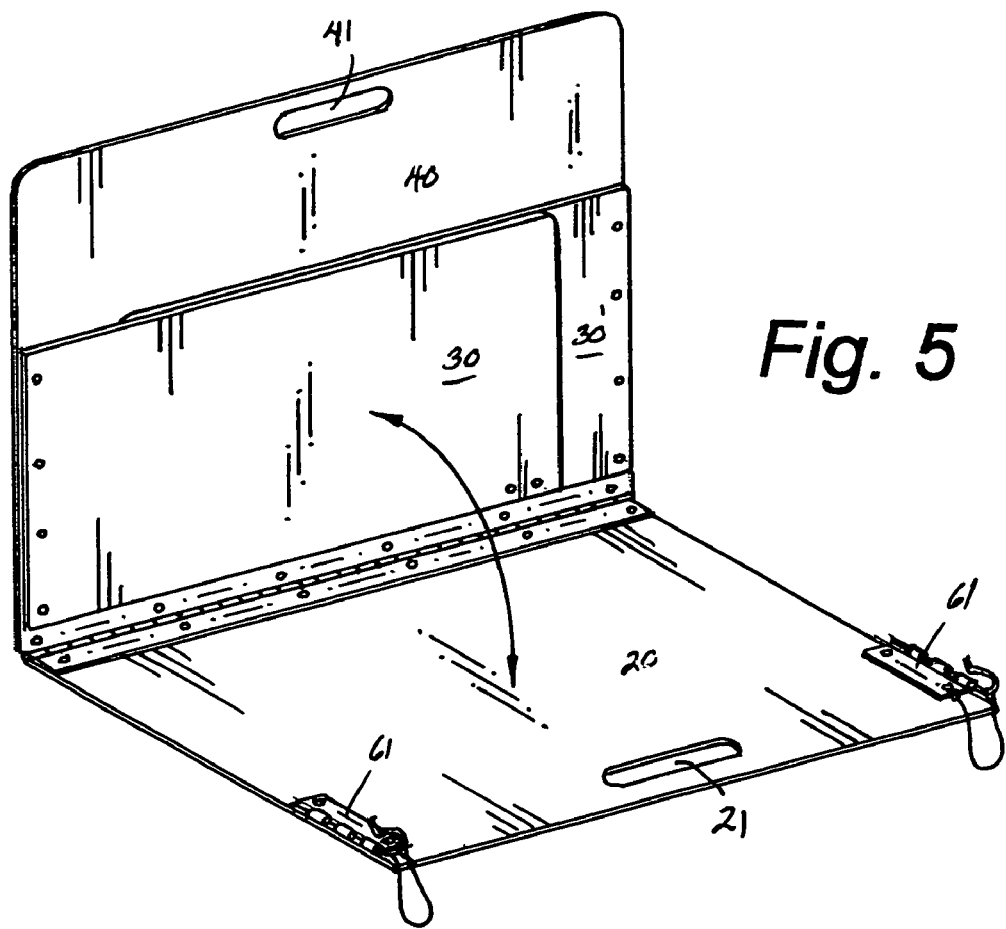
Figure 6:
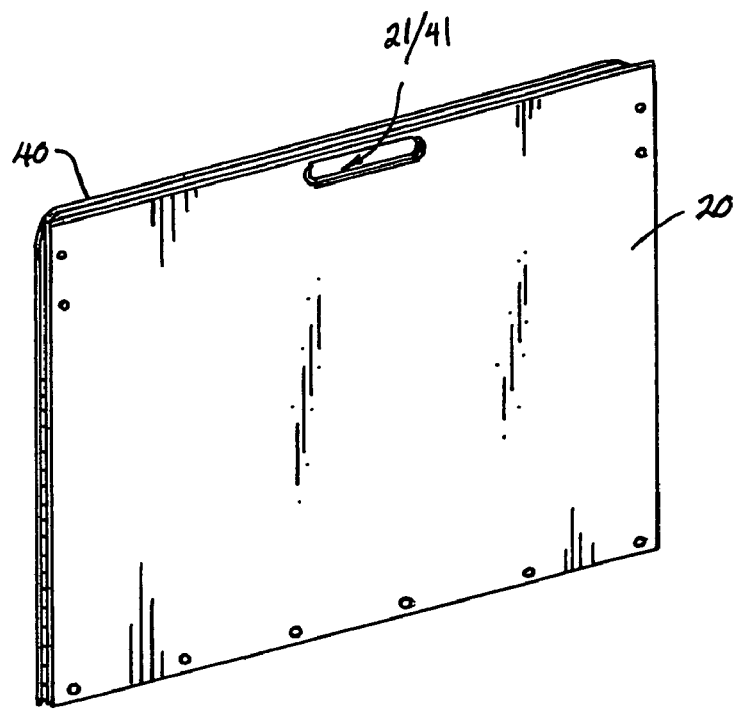
Figure 7:
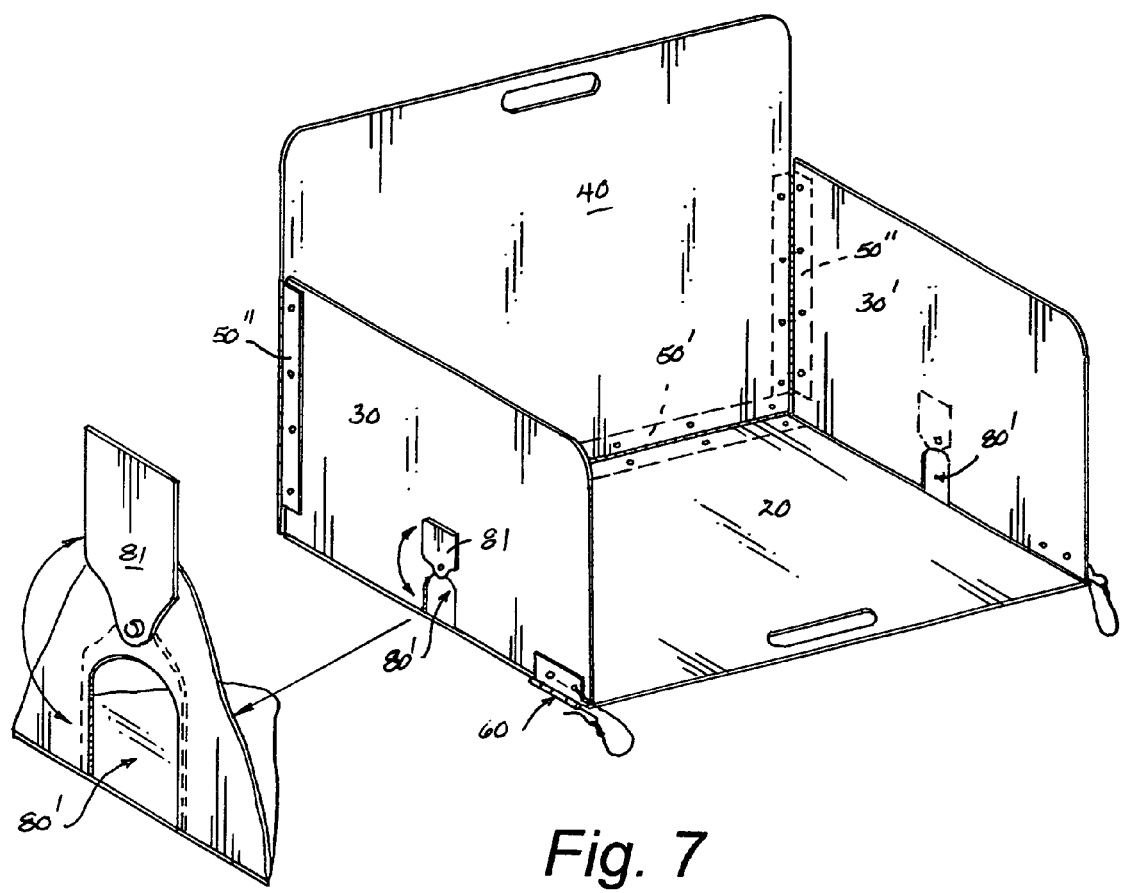

FIG. $3_A$ is an enlarged detail view of alternate hinge arrangements;

FIG. 4 shows the side wall members released from the base member and partially collapsed against the rear wall member;

FIG. 5 shows the side wall members fully collapsed against the rear wall member;

FIG. 6 shows the wind screen apparatus in its fully collapsed mode; and,

FIG. 7 is a perspective view of an alternate version of the preferred embodiment.

DETAILED DESCRIPTION OF THE INVENTION

As can be seen by reference to the drawings, and in particular to FIG. 1, the wind screen apparatus for outdoor grills that forms the basis of the present invention is designated generally by the reference number 10. The apparatus 10 comprises in general a base member 20, a pair of opposed side wall members 30 30' and a rear wall member 40 wherein, the side wall members 30 30' and the base member 20 in the preferred embodiment of the invention are operatively connected to the rear wall member 20 via hinge elements 50 and the side wall members 30 30' are releasably associated with the base member 20 via releasable securing elements 60.

As can best be seen by reference to FIG. 1, all of the wall members 30 30 and 40, as well as, the base member 20 are fabricated from sheets of heat proof, fireproof material 70 such as aluminum, steel or the like wherein, in the preferred embodiment of the invention, the sheets of material 70 are fabricated specifically from aluminum due to its lack of heat conductivity.

Still referring to FIG. 1, it can be seen that the base member 20 and the rear wall member 40 are provided with rounded corners 32 32' and 42 42 such that the upper exposed corners of the wind screen apparatus 10 do not have any sharp exposed edges.

Turning now to FIGS. 1 and 2, it can be seen that the rear wall member 40 is connected to the base member 20 via a full length hinge element 50' while the side wall members 30 30' are connected to the rear wall member 40 via a partial length hinge element 50" given the fact that the rear wall member 40 has the same general dimensions as the base member 20 and the height of the rear wall member 40 is substantially greater than the height of the opposed rear wall members 30 30'.

As can also be appreciated by reference to FIGS. 1 and 2, the partial length hinge arrangement 50" between the rear wall member 40 and the opposed side wall members 30 30' creates openings 80 between the inboard ends of the opposed side wall members 30 30' and the base member 20 wherein, the openings 80 are dimensioned to receive a gas line from a propane tank or the like when one or more portable gas grills (not shown) rests on the base member 20.

Figure 3A:
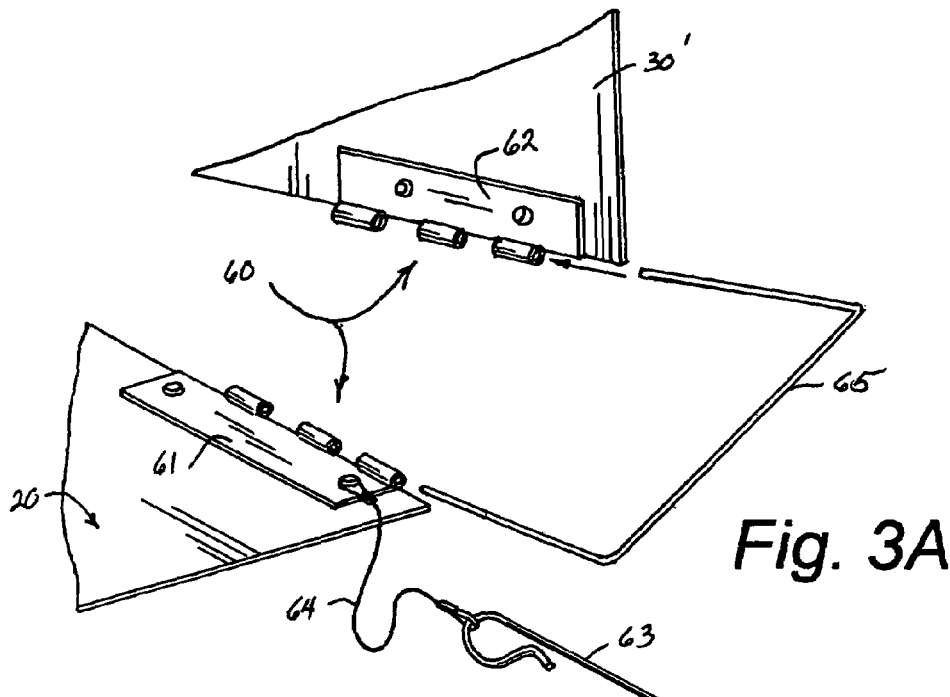
FIG. 3 is an enlarged detail view of the releasable engagement between the free end of one of the side wall members and the base member.

Turning now to FIGS. 1 and 3, it can be seen that the releasable engaging elements 60 that connect the outboard ends of the opposed side wall members to the outboard side edges of the base member 20 comprise a pair of open hinge components 61 62 and a removable hinge pin 63 having a tether 64.

At this juncture, it should be noted that in the preferred embodiment, the apparatus 10 provides a three sided enclosure wherein, all of the wall members 30 30' and 40 have a height that exceeds the top of a grill (not shown) and the rear wall 40 is substantially taller than the side walls 30 30' plus the fact that the base member 40 is dimensioned to provide a heat proof platform that is dimensioned to support one or more grills.

Turning now to FIG. 7, it can be seen that in the alternate version of the preferred embodiment, the position of the full length hinge element 50' and the partial length hinge elements 50", as well as, the releasable engaging elements 60, have been disposed on the exterior surfaces of the base member 20, the rear wall member 40 and the side wall members 30 30' wherein, the side wall members 30 30' extend below the partial length hinge elements 50" so that the side wall members 30 30' are disposed in flush contact with the base member 20 along their respective lengths.

In this version of the preferred embodiment, one or more gas line openings 80' are formed in one or more of the side wall members 30 30' and the rear wall member 40 wherein, each gas line opening 80' is further provided with a pivoting closure element 81 which is deployed when a particular gas line opening 80' is not in use.

It should further be noted that in all of the embodiments described herein, all of the gas line openings 80 80' are disposed in close proximity to the base member 20 and substantially below the level of a grill flame, for the specific purpose of insuring that any wind entering through the gas line openings 80 will not have any impact on the heat source.

In addition, as shown in FIGS. 4 through 7, in both the preferred and alternate embodiments of the invention, both of the side wall members 30 30' are designed to be folded in an overlapping fashion relative to the rear wall member 40 which is then folded against the base member 20 to align the handle apertures 21 41 for transporting the apparatus 10 to and from an outdoor cooking site.

As was also mentioned previously, the windscreen apparatus 10 that forms the basis of the present invention is dimensioned to accommodate at least one portable cooking grill and in the single grill version, the preferred dimensions of the base member 20 and rear wall member 40 are approximately 18"×24" and the preferred dimensions of the opposed side walls 30 30' are approximately 12"×18" with the double grill versions being proportionately larger.

Furthermore, as depicted in FIG. $3_A$, in order to accommodate oversize grills, this invention further contemplates the use of oversize generally U-shaped hinge pin elements 65 that will angle the side wall members 30 30' outwardly from the base member 20.

Although only exemplary embodiments of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A windscreen apparatus for outdoor cooking grills wherein, the wind screen apparatus consists of:
   a generally continuous rectangular and planar cooking grill base member dimensioned to distinguishably support, fit beneath and project beyond the outer periphery of an outdoor cooking grill;
   a rear wall member hingedly connected to said base member;
   wherein, the rear wall member has the same general dimensions as said base member;
   a pair of side wall members wherein, each side wall member is hingedly connected to a selected one of the rear wall member and the base member; and
   wherein the base member, rear wall and pair of sidewalls have an (a) operative position wherein the rear wall and pair of sidewalls are all substantially perpendicular to the base member wherein the outdoor cooking grill can be placed on the base member so as to be shielded from the wind and a (b) transport position wherein the real member, the pair of sidewalls and the base member are disposed in substantially parallel planes to provide a substantially flat profile.

2. The apparatus as in claim 1; wherein, all of the wall members and the base member are fabricated from sheets of fireproof material.

3. The apparatus as in claim 1; wherein, all of the wall members and the base member are fabricated from sheets of heat proof material.

4. The apparatus as in claim 1; wherein, all of the wall members and the base member are fabricated from sheets of aluminum.

5. The apparatus as in claim 1; further comprising releasable securing means for maintaining all of the wall members in an upright position relative to the base member.

6. The apparatus as in claim 1 further including at least one gas line opening associated with one of the wall members.

7. The apparatus as in claim 1; wherein, a gas line opening exists between at least one of the side wall members and the base member.

8. The apparatus as in claim 5 further including at least one gas line opening associated with one of the wall members.

9. The apparatus as in claim 5; wherein, a gas line opening exists between at least one of the side wall members and the base member.

10. The apparatus as in claim 1; wherein, each of the side wall members is provided with at least one gas line opening.

11. The apparatus as in claim 1; wherein, at least one of the side wall members and the rear wall member are provided with a gas line opening.

12. The apparatus as in claim 1; wherein, the rear wall member is provided with a pair of gas line openings.

13. The apparatus as in claim 1; wherein, the height of the rear wall member is greater than the height of each of the side wall members.

14. The apparatus as in claim 1; wherein, the rear wall member and the base member are provided with alignable handle apertures.

15. The apparatus as in claim 5; wherein, the rear wall member and the base member are provided with alignable handle apertures.

16. The apparatus as in claim 6; wherein, the rear wall member and the base member are provided with alignable handle apertures.

17. The apparatus as in claim 5; further including at least one gas line opening associated with one of the wall members.

18. The apparatus as in claim 17; wherein, the height of the rear wall member is greater than the height of each of the side wall members.

19. The apparatus as in claim 18; wherein, the rear wall member and the base member are provided with alignable handle apertures.

20. The apparatus as in claim 19; wherein, all of the wall members and the base member are fabricated from sheets of aluminum.

* * * * *